United States Patent [19]

Davidson et al.

[11] Patent Number: 4,988,209

[45] Date of Patent: Jan. 29, 1991

[54] TELEPHONE AGENT MANAGEMENT INFORMATION SYSTEM

[75] Inventors: Wayne A. Davidson, Winfield; Sahadat Hossain, Batavia, both of Ill.

[73] Assignee: AT&T Bell Laboratories, Murray Hill, N.J.

[21] Appl. No.: 291,814

[22] Filed: Dec. 29, 1988

[51] Int. Cl.⁵ .......................................... H04M 11/00
[52] U.S. Cl. ..................................... 370/58.2; 370/60; 370/110.1; 379/93; 379/94; 379/96; 379/112; 379/113
[58] Field of Search ....................... 370/58.1, 60, 60.1, 370/110.1, 58.2, 58.3, 62; 379/93, 94, 96, 112, 156, 157, 113, 122, 136, 34, 158, 211, 212, 213, 214, 215, 265, 266, 269; 380/25, 49; 340/825.31, 825.34

[56] References Cited

U.S. PATENT DOCUMENTS

| | | | |
|---|---|---|---|
| 4,048,452 | 9/1977 | Oehring et al. | 179/27 |
| 4,436,962 | 3/1984 | Davis et al. | 179/18 |
| 4,436,963 | 3/1984 | Cottrell et al. | 179/18 |
| 4,476,349 | 10/1984 | Cottrell et al. | 179/18 |
| 4,559,416 | 12/1985 | Theis et al. | 179/7.1 R |
| 4,592,048 | 5/1986 | Beckner et al. | 370/60 |
| 4,599,493 | 7/1986 | Cave | 179/18 |
| 4,653,085 | 3/1987 | Chan et al. | 379/94 |
| 4,656,623 | 4/1987 | Dalby, Jr. et al. | 379/94 |
| 4,694,483 | 9/1987 | Cheung | 379/112 |
| 4,712,230 | 12/1987 | Rice et al. | 379/112 |
| 4,734,931 | 3/1988 | Bourg et al. | 379/93 |
| 4,739,509 | 4/1988 | Bourg | 379/93 |
| 4,741,026 | 4/1988 | Baxter et al. | 379/158 |
| 4,748,656 | 5/1988 | Gibbs et al. | 379/93 |
| 4,757,529 | 7/1988 | Glapa et al. | 379/244 |
| 4,763,353 | 8/1988 | Canale et al. | 379/157 |
| 4,876,717 | 10/1989 | Barron et al. | 380/25 |

FOREIGN PATENT DOCUMENTS 0020792 1/1989 Japan ..................................... 379/94

OTHER PUBLICATIONS

AT&T, "Call Management System (CMS)", PM-4495 F/HG, 1987, brochure.
AT&T, "5ESS TM Switch ISDN Basic Rate Interface Specification 5E4 Generic Program", AT&T 5D5-90-0-301, 1985.
Strathmeyer, C., "Voice/Data Integration: An Applications Perspective", vol. 25, No. 12, Dec. 1987, *IEEE Communications Magazine*, pp. 30–35.

Primary Examiner—Douglas W. Olms
Assistant Examiner—Alpus H. Hsu
Attorney, Agent, or Firm—R. T. Watland

[57] ABSTRACT

A computer connected to an ISDN switch via an ISDN digital subscriber line, provides management information regarding activities of a plurality of telephone agents. The computer has shared call appearances with a number of telephone agent stations and receives shared call appearance associated messages from the switch reflecting call handling messages exchanged between the ISDN switch and each of the agent stations. The messages are interpreted by the computer which generates station status information and management information such as the number of calls handled, average holding time per call, etc. The computer may be connected simultaneously to several central offices via ISDN subscriber lines and generate management information for a group of geographically separated agents, such as home telemarketing agents operating out of their individual homes and connected to different central offices.

14 Claims, 8 Drawing Sheets

TELEPHONE AGENT MANAGEMENT INFORMATION SYSTEM

CROSS-REFERENCE TO RELATED APPLICATION

The following U.S. applications, which are assigned to the assignee of the instant application and filed concurrently herewith, have related subject matter:

(1) Automated Call Handling Apparatus: by W. A. Davidson and D. S. Winter.

(2) Telephone Agent Call Management System: by W. A. Davidson and D. S. Winter.

FIELD OF INVENTION

The invention relates to the collecting of information for the management of a plurality of telephone agents at stations connected to a switching system. More paticularly, the invention relates to such an arrangement which is separate from the switching system to which the agents are connected.

BACKGROUND OF THE INVENTION

Many businesses employ groups of telephone agents for a variety of purposes, such as telemarketing information dispensing, order taking, and the like. Switching systems are known which include automatic call distribution arrangements for distributing incoming calls among call answering agents and for collecting management information regarding the operation of the telephone agent work force. The management information is used by telemarketing managers to determine the proper allocation of staffing, resources, etc. A switching system which performs the automatic distribution of incoming calls may be a central office switch or a switching system on a company's premises, such as a PBX switch or a sophisticated key telephone system. Management information may be obtainable from such switching systems which specify the number of calls handled by an agent, the average time on a call, etc. However, a significant amount of overhead is associated with providing that service from a central office, making the cost per agent station very expensive for companies with a comparatively small number of agents. Furthermore, while the information may be obtained from PBX or key switching systems that are on a company's premises, such systems are often too costly for smaller companies with a relatively low number of agent stations.

SUMMARY OF THE INVENTION

In accordance with this invention, a computer, separate from the switching system, computes management information for telephone agent stations connected to a switching system. The computer receives digital messages corresponding to call related information transmitted between the stations and the switch and compiles statistics defining agent station activity based on information extracted from the call related information. In accordance with one aspect of the invention, the computer is used with a switching system adapted for the well-known Integrated Services Digital Network (ISDN) and, by means of a feature of the ISDN switch sometimes referred to as the shared call appearance feature, the computer receives the so-called associated messages usually transmitted to an associated subscriber station. The switching system may be a central office switch or PBX switch adapted for ISDN. Advantageously, the only special equipment required on the subscriber premises is a programmable computer and a commercially available ISDN computer interface card. The computer may be an inexpensive personal computer programmed in accordance with the principles of this invention to provide the desired management data on a low cost basis.

In accordance with one aspect of the invention the computer is connected to an ISDN switch via an individual digital subscriber line and the switch transmits to the computer call handling messages associated with one or more agent stations. Several such computers may transmit collected information to one central computer which consolidates the data from the groups of agent stations to provide collective statistics. Advantageously, the central computer need not be located near the agent stations or connected to the same switch as the agents being monitored and the agent stations need not be ISDN stations. This is particularly advantageous where a company has agents, such as telemarketing agents operating from a number of different offices or out of homes connected to different central office switching systems.

In accordance with another aspect of the invention, a single computer is connected to a plurality of central offices via individual digital subscriber lines to receive call handling messages related to agents on each of the connected offices. Advantageously, a single computer may thus gather management information data for agents from a plurality of central offices.

BRIEF DESCRIPTION OF THE DRAWING

The invention may be better understood from the following detailed description when read in conjunction with the drawing in which.

DETAILED DESCRIPTION

Figure 1:
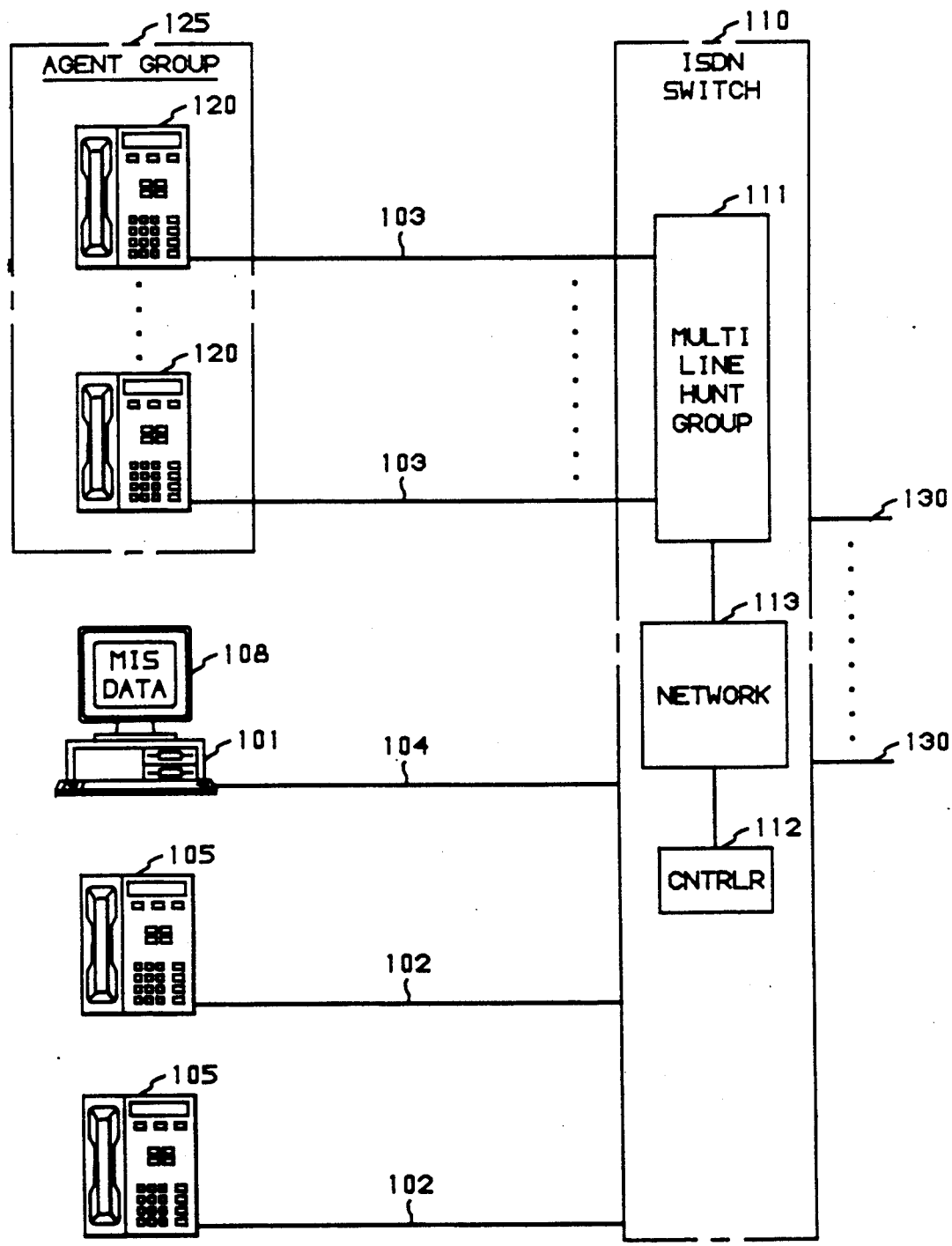
FIG. 1 is a representation of an ISDN switch together with a plurality of agent stations and a monitoring computer, connected to the switch via individual subscriber lines.

FIG. 1 is a representation of an illustrative telephone system incorporating a telephone agent management information system in accordance with the principles of this invention. The management information system comprises a monitoring computer 101 connected via an ISDN digital subscriber line 104 to an ISDN central office switch 110. In the configuration shown in FIG. 1, an agent group 125 comprising a plurality of agent stations 120, is served from the ISDN switch 110 through what is known as a multi-line hunt group 111. Typically, a company employing a group of agents for the purpose of answering incoming calls will have a directory number to which calls are directed and the multi-line hunt group arrangement will distribute the calls to the agent positions in a well-known manner, in accordance with a predetermined distribution scheme. The switch 110 receives incoming calls, for example from ISDN stations 105 or from other central offices via trunks 130. The agent stations 120 may be assigned a directory number for identification by the switch and computer 101. Commonly, calls may also be made directly to the agent stations at the assigned directory number and outgoing calls may be made from the agent stations 120 through switch 110.

The ISDN switch 110 may be a well-known telecommunication switch adapted for use in the Integrated Services Digital Network. One such switch is disclosed in U.S. Pat. No. 4,592,048 of M. W. Beckner et.al., entitled "Integrated Packet Switching and Circuit Switching System". The system includes a controller 112 which controls the interchange of ISDN messages between the switch 110 and the agent stations 120 as well as the computer 101 and other stations 105. A network 113 functions under control of controller 112 to provide the necessary interconnections within the switch 110. The agent stations 120 and subscriber stations 105 may be any well-known ISDN stations adapted to interface via an ISDN digital subscriber line with an ISDN switching system or standard analog stations. The interface between an ISDN station and an ISDN switch is specified generally by the International Telegraph and Telephone Consultative Committee (CCITT) and more specifically defined in a document entitled "5ESS Switch ISDN Basic Rate Interface Specification" published by AT&T in 1985. This document specifies the messages that are transmitted from the switch to the station as well as the messages that are expected to be transmitted from the station to the switch. The interface between the switch and the station is referred to as an ISDN basic rate 2B+D interface. The 2B+D designation refers to the two 64 kilobit channels for the transmission of encoded voice or data and the 16 kilobit D-channel used primarily for the transmission of control messages, contained in the ISDN subscriber line. In a typical scenario, ISDN switch responds to an incoming call directed to the agent group by selecting one of the stations 120 and transmitting a SETUP message to the selected station. The station responds with an ALERTING message indicating that an alerting signal is being generated at the station. This will be followed by a CONNECT message when the station goes off hook. A DISCONNECT message may be transmitted from the switch to the station or vice versa depending upon whether the calling station or the called station initiates the disconnect.

The aforementioned Basic Rate Interface document includes key system features, defining interactions between key systems and the central office switch for two or more associated telephone terminals sharing call appearances. As described in the afore referenced interface documents, so-called associated messages are sent from the central office switch to each of the associated telephone station. As mentioned above, ISDN call handling messages such as call SETUP, ALERTING, CONNECT, DISCONNECT, etc. are transmitted between the switching system and the telephone station. Associated messages are messages transmitted to an associated station and correspond to certain of the messages transmitted between a principal station and the switch. For example, when an incoming call is directed to one of the agent stations 120, the selected agent station and the computer 101 will both receive a call SETUP message. Only the agent station will respond to the message. Thereafter, the switch communicates with the agent and transmits associated messages to the computer, which interprets the associated messages and generates data defining agent station activity. The computer may also provide station activity data for analog stations. For example, one or more of the agent stations 120 may be an analog station connected to the ISDN switch 110 via an analog line. In that case the switch will exchange analog signals with the analog set, but will send digital ISDN associated messages to the computer.

Figure 2:
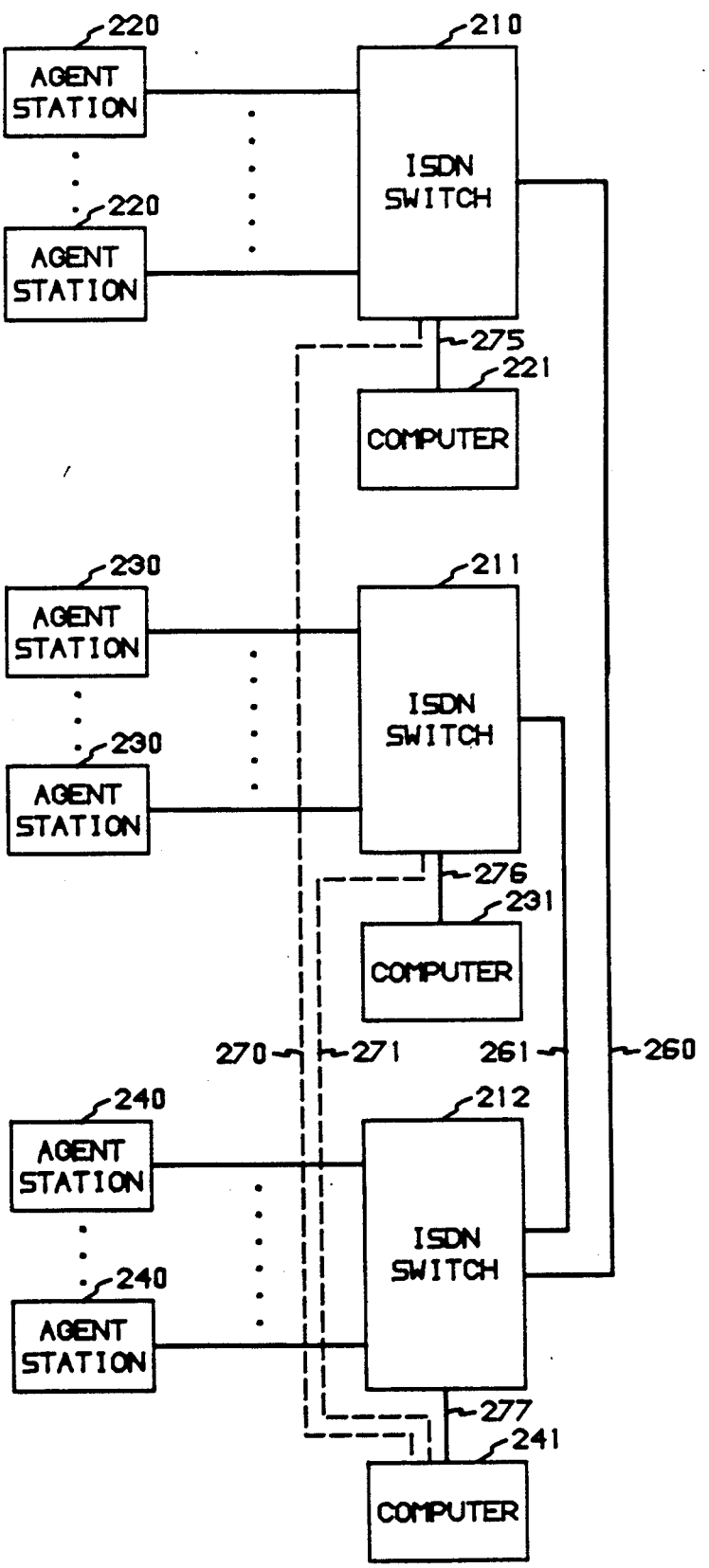
FIG. 2 is a representation of a plurality of ISDN switches and computers for collecting agent data from the switches.

FIG. 2 is a block diagram representation of a plurality of ISDN switches 210, 211 and 212 which have the same characteristics as switch 101 of FIG. 1. Each has one or more agent stations connected thereto. Specifically the agent stations 220 are connected to the switch 210, agent stations 230 are connected to the switch 211 and agent stations 240 are connected to the switch 212. A computer 221 is connected to the switch 210 via a standard ISDN line 275 and collects data from the agent stations 220 in the same manner as described with respect to computer 101 and the agent stations 120 of FIG. 1. Similarly, computers 231 and 241 are connected via ISDN lines 276 and 277 to switches 211 and 212, respectively. The switches 210, 211 and 212 may be situated in geographically separated locations and the agent stations 220, 230 and 240 may all belong to one company having agents operating out of geographically separated offices or agents' homes. One of the computers, for example computer 241 connected to switch 212 may be designated as a main computer for collecting data for all of the agents connected to the different switching systems. Data collected by the computer 221 for agent stations 220 may be transmitted via switch 210 and interconnecting data link 260 through switch 212 to the computer 241 in a well-known fashion. Similarly, computer 231 collects data for agent stations 230 and its data may be transmitted via a switch 211 and data link 261 and further via switch 212 to the computer 241. The computer 241 may collect the data concerning the operations of the agents 240 connected to the switch 212 and may be used to generate a composite report on all of the agent stations 220, 230 and 240. An alternative approach to collecting the data from distant switching offices is by means of the so-called foreign exchange line 270 which provides a direct telephone connection to a remotely located terminal such as computer 241. A similar foreign exchange line 271 may be connected from switch 211 to the computer 241. In that case, the computer 241 will use the shared call appearance feature of switch 210 via foreign exchange line 270, of switch 211 via a foreign exchange line 271, and of switch 212 via the direct subscriber line connection 277. Foreign exchange lines are subscriber lines from a distant central office, frequently located in another city. An ISDN foreign exchange line is a subscriber line from a distant ISDN switching office having the same characteristics and protocols as a standard ISDN line described in the aforementioned Basic Rate Interface document. In this manner a single computer is used to collect agent station activity data from a plurality of geographically separated central office switches.

Figure 3:
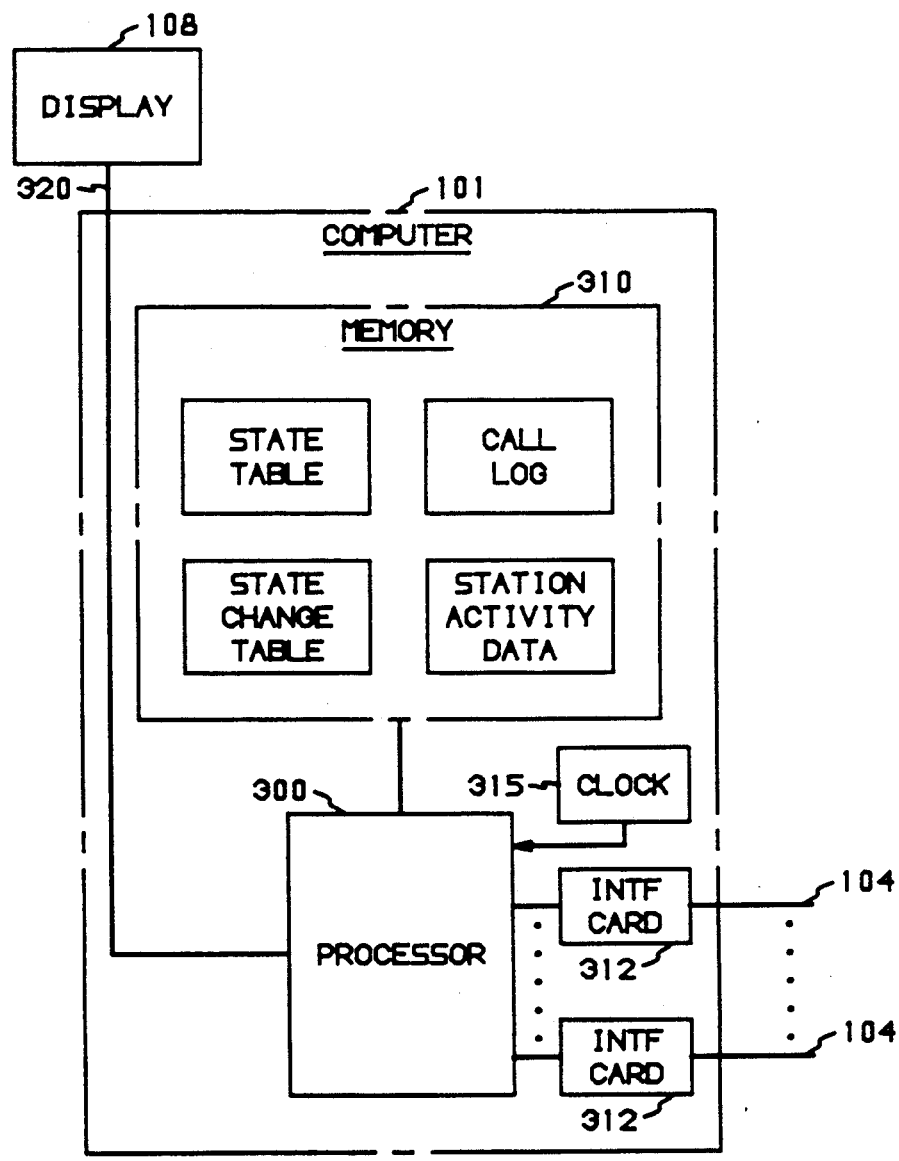
FIG. 3 is a block diagram representation of the computer of the arrangements of FIG. 1 and 2.

The computer 101 or computers 221, 231 and 241 may be a well-known personal computer such as the AT&T 6300 PLUS personal computer. FIG. 3 is a block diagram representation of the computers of FIGS. 1 and 2, comprising a program controlled processor 300 for executing program sequences as depicted in FIGS. 4 through 8. The processor 300 is connected to one or more ISDN lines via commerically available interface cards 312. This may be the TELEOS ISDN PC card made by Teleos Company, which provides signal compatibility between the ISDN line and the computer. The computer further comprises a memory 310 for storing programs and data such as the State Table, the State Change Table, the Call Log and the Station Activity Data. A clock circuit 315 provides required clock signals to the processor 300 and a time-of-day signal used in generating time stamps for use in time recording. The processor 300 is connected to a display, e.g. 108, via cable 320.

Figure 4:
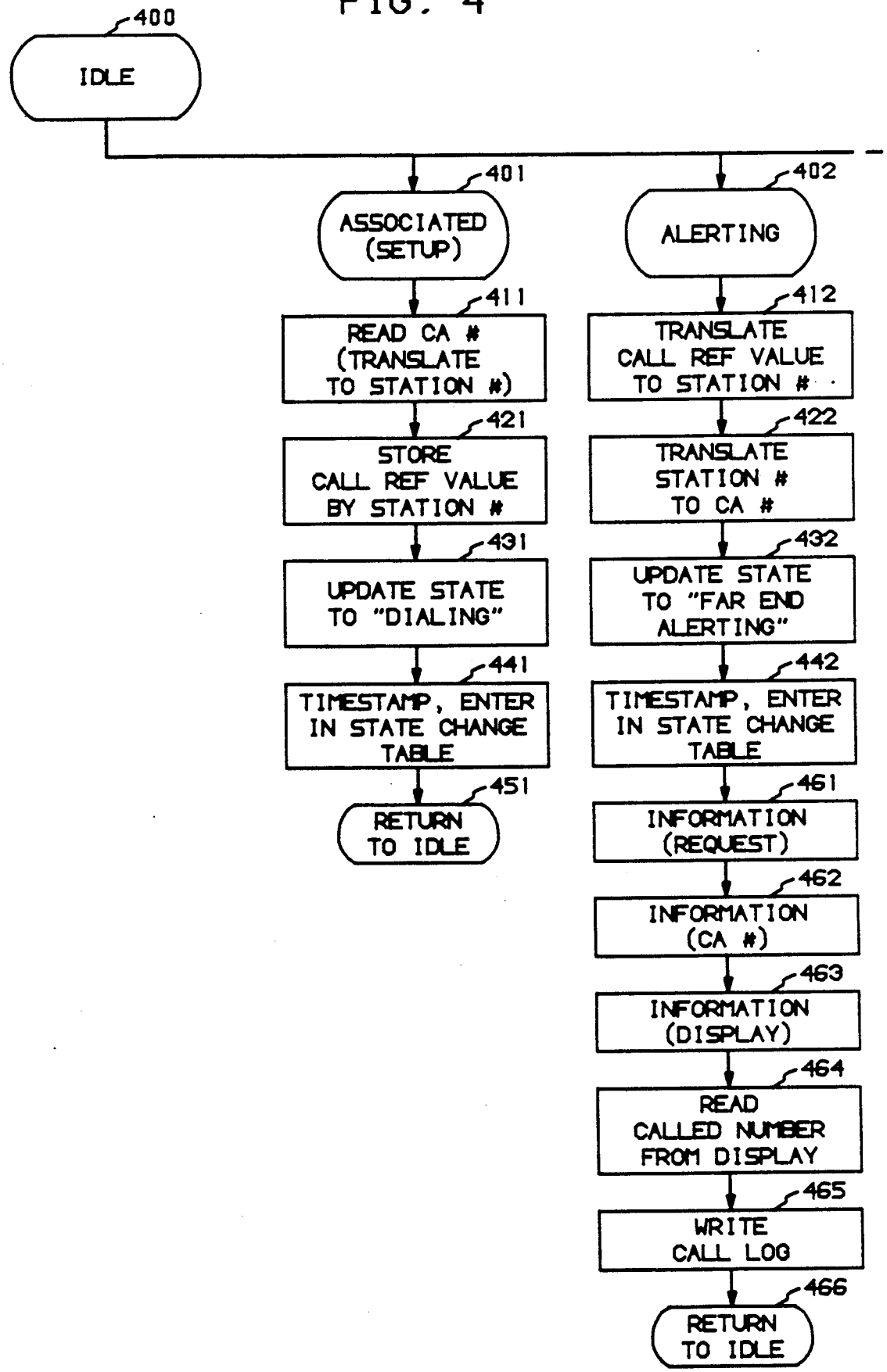
FIGS. 4 through 6 are flow chart representations of functions performed by the computer in collecting operational data.
Figure 5:
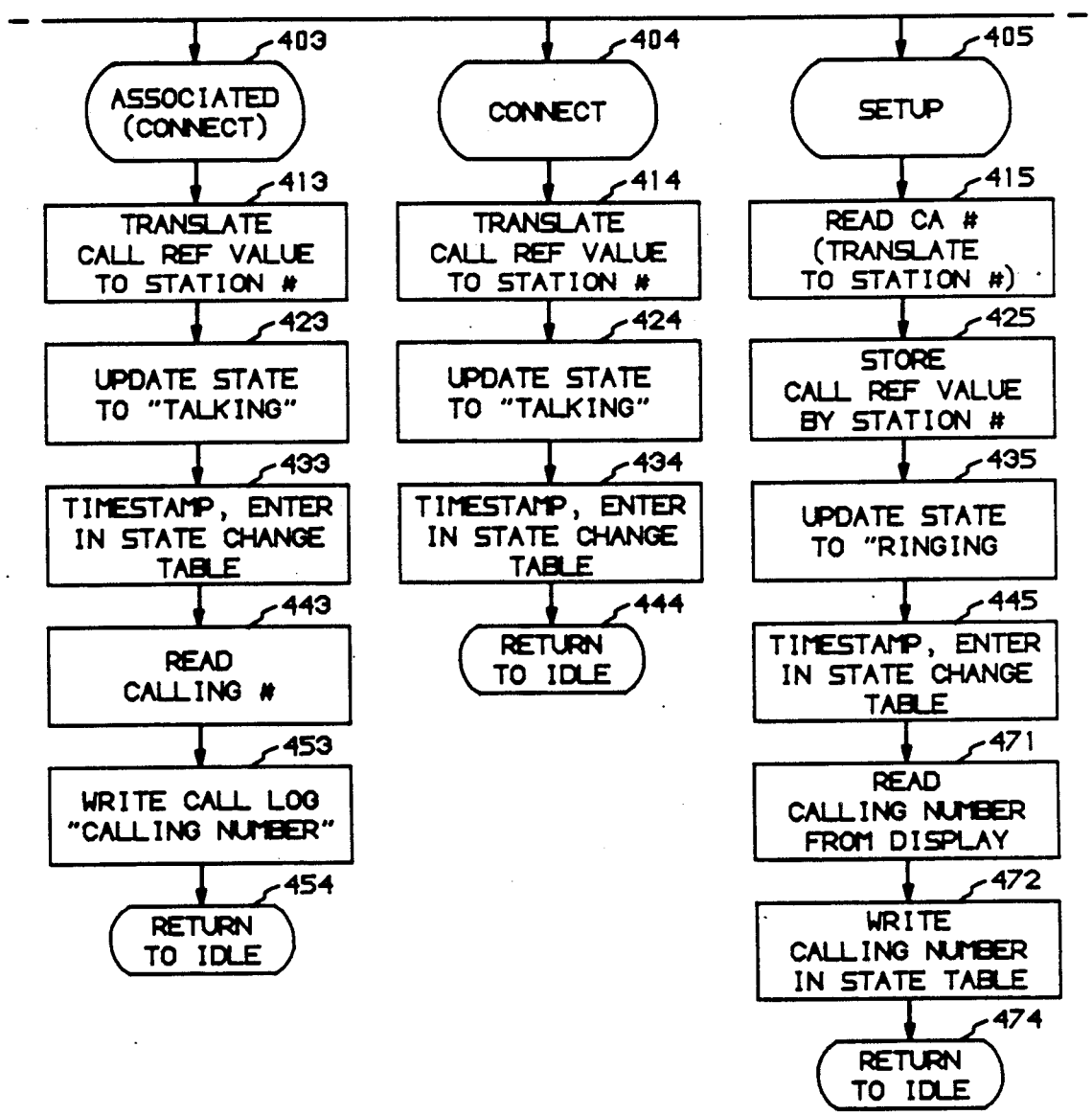
Figure 6:
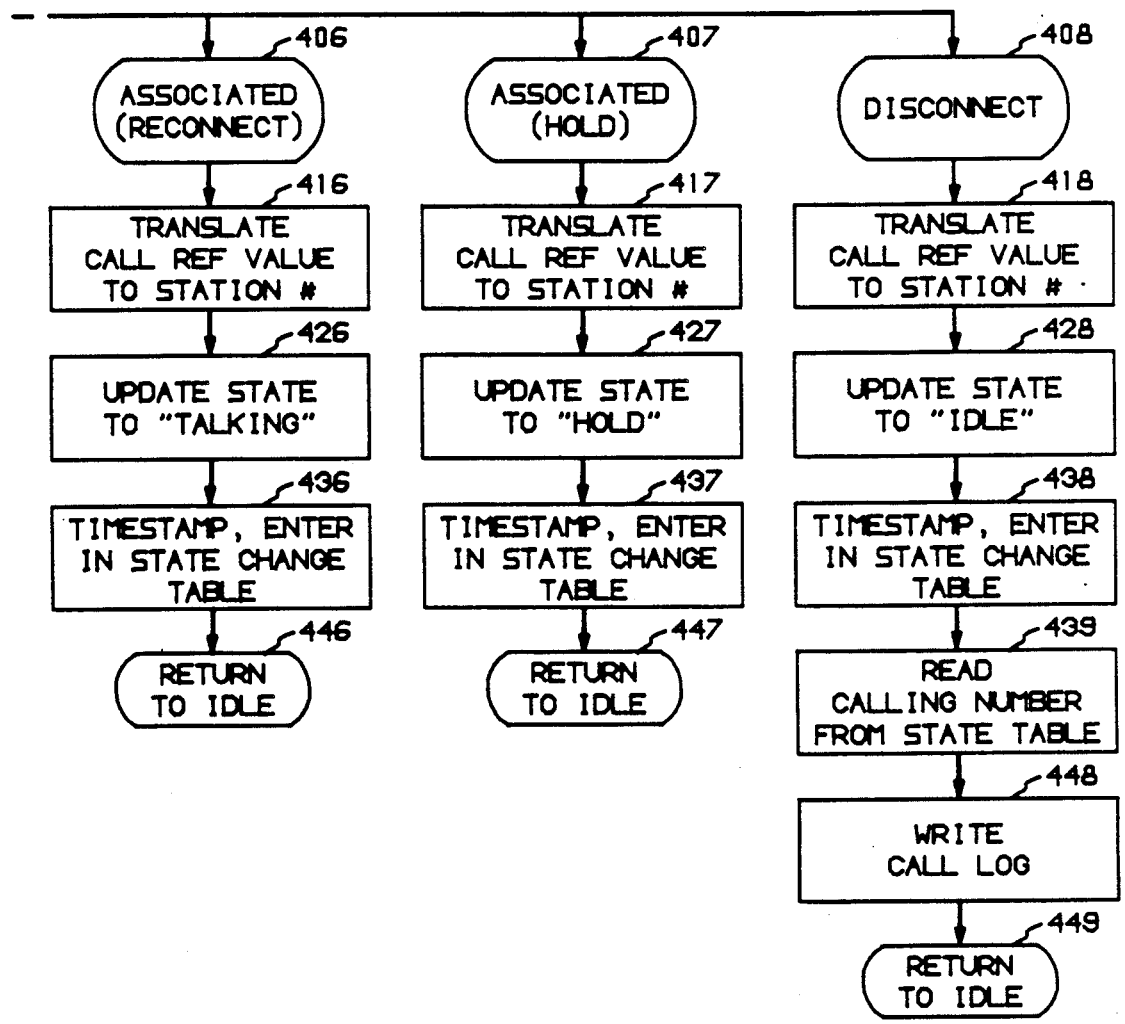
Figure 7:
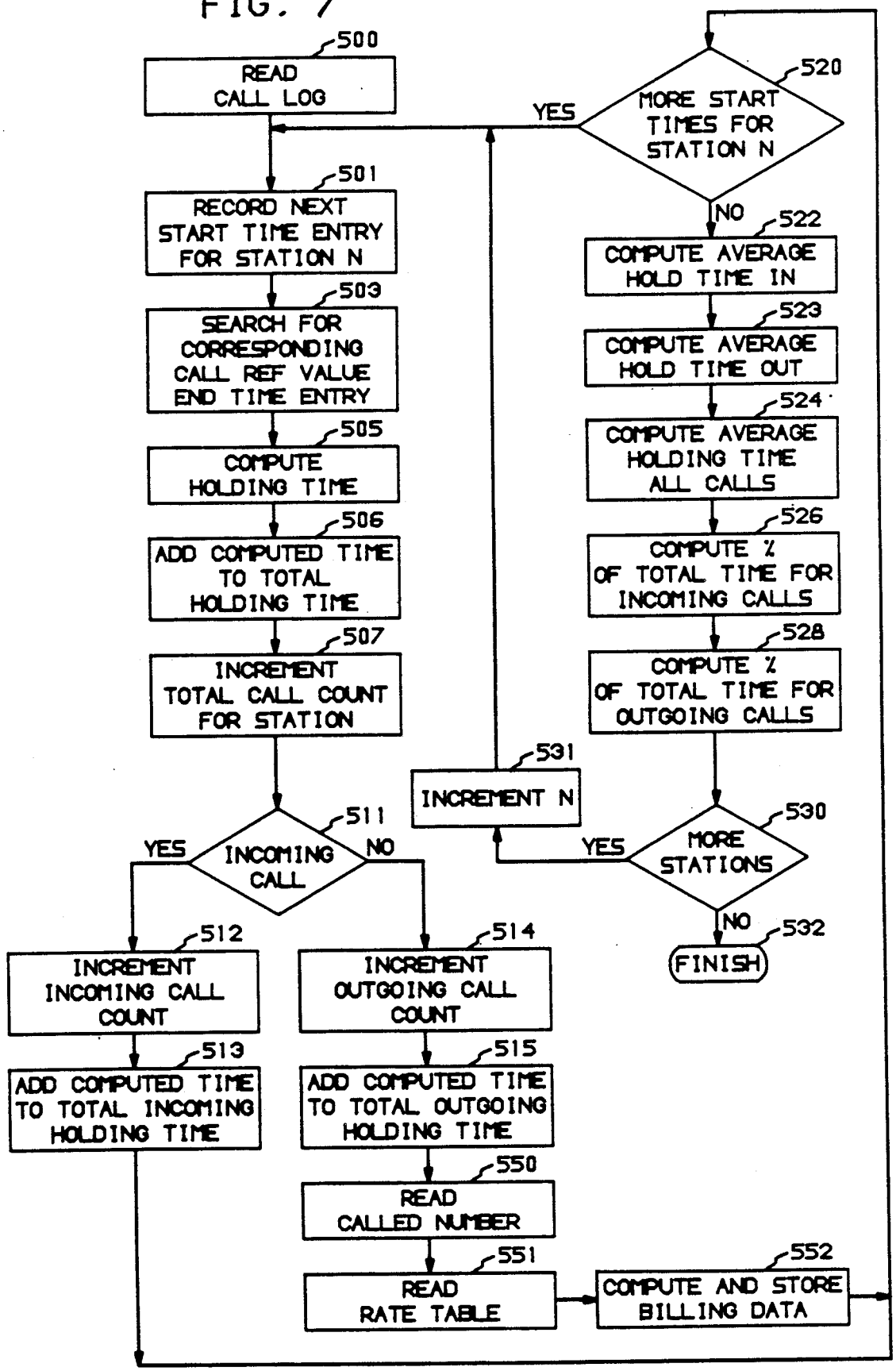
FIGS. 7 and 8 are flow chart representations of functions performed by the computer in generating management information.
Figure 8:
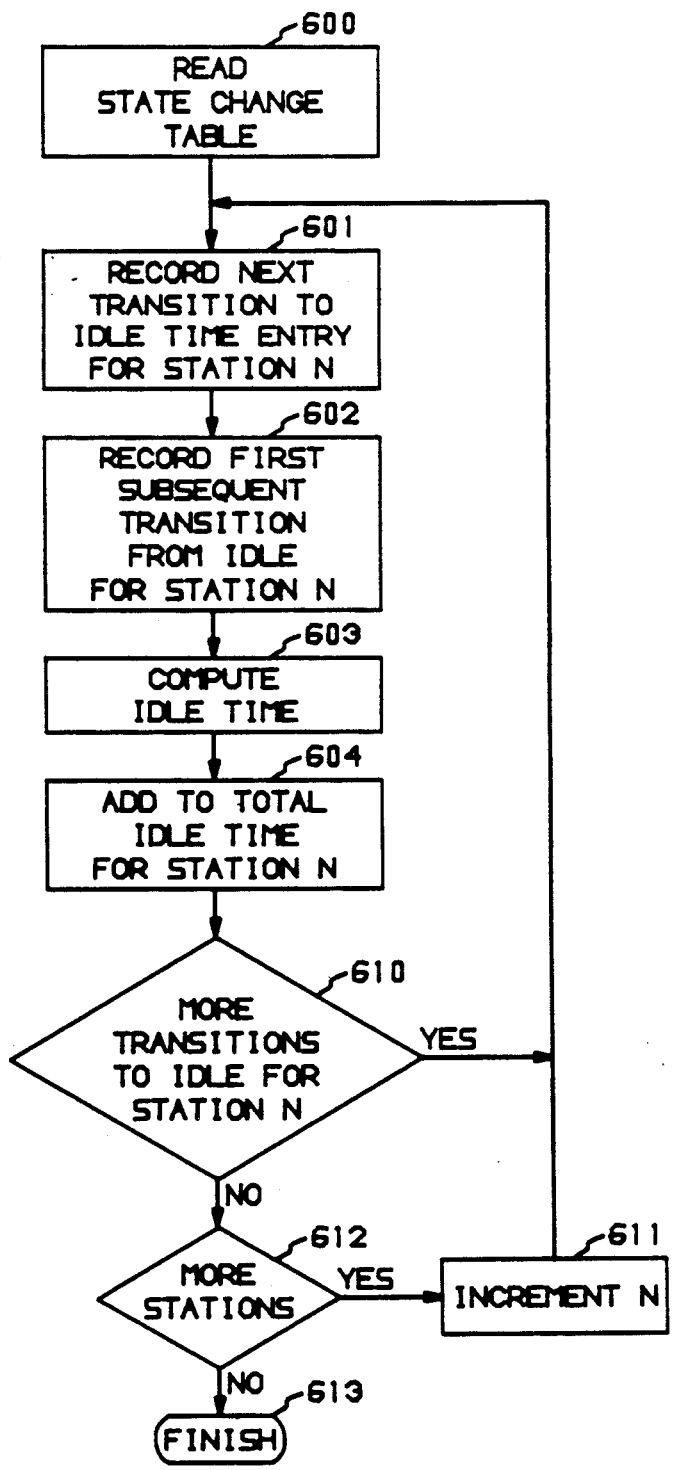

FIGS. 4 through 6 are flow chart representations of information gathering functions performed by the computers of FIGS. 1 and 2 in response to the various messages which the computer will receive from the connected switch by virtue of the shared call appearance with each of the several agent stations. FIGS. 7 and 8 are flow chart representations of functions performed in computing station activity data. The flow charts of FIGS. 4 through 8 are described in the following paragraphs with respect to computer 101 in FIG. 1. Analogous functions will be performed by computers 221, 231 and 241 in the system of FIG. 2.

In FIGS. 4 through 6, block 400 represents the idle state of the computer 101 and blocks 401 through 408 represent eight message types which will be transmitted to the computer from the switch. Table 1, in the first column, shows the messages exchanged over an ISDN subscriber line between the ISDN switch 110 and an ISDN subscriber station 120; the second column shows the direction of the messages; the third column lists the corresponding shared call appearance associated ISDN messages received by the computer; and the fourth column lists the functional significance of the various messages to the computer. The computer 101 will receive these messages for the various shared call appearances as they are transmitted by the switch and may store the messages in buffers as they are received. FIGS. 4 through 6 show the sequences executed by the computer in recording relevant information extracted from the messages. By way of example, block 401 represents the processing of the ASSOCIATED (SETUP) message by the computer 101. The computer enters a program routine which advances to block 411 where it reads the origination call appearance number which is included in the ASSOCIATED (SETUP) message. Table 2 lists, by way of example, typical information elements contained in a message. Each of the ISDN messages referred to herein is defined in the aforementioned Basic Rate Interface document. The call appearance number obtained from the message is translated into a station number in block 411 by means of information in the State Table stored in memory 310. The State Table contains directory numbers and call appearance numbers for each of the agent stations 120. The directory or station numbers and call appearance number are permanently assigned. Hence, the table allows for the translation between directory or station numbers and call appearance numbers. Other data in the table is altered as messages are received from the switch, including states of calls for each of the agent stations, call reference values for each of the calls and calling number information. Table 3 is an exemplary State Table layout showing arbitrary directory numbers for seven agent stations 120, and arbitrarily assigned call states, call appearance numbers (CA), call reference values (CR) and calling numbers. In block 421 of FIG. 4, the computer stores the call reference value obtained from the ASSOCIATED (SETUP) message in the State Table with the corresponding call appearance number and station number. In block 431 the computer updates the state of the call in the State Table entry associated with the call appearance identified in the received message. As shown in the fourth column of Table 1, the computer interprets the ASSOCIATED (SETUP) message as corresponding to an origination dialing action. Accordingly, the state in the State Table is updated to dialing in response to this message. In block 441 a time stamp derived from the computer's clock 315 is entered in State Change Table in the computer memory 310 together with an indication of state change, i.e., idle to dialing, and the station number. An exemplary State Change Table memory layout is shown in Table 4. The contents of this table is used by the computer 101 to compile statistics reflecting agent activity, as will be described later herein with reference to FIGS. 7 and 8. In each case, upon completion of the various steps in response to the receipt of a message, the computer 101 will return to the idle state as indicated in block 451.

It should be understood that FIGS. 4 through 6 are representations of the action of the computer 101 in response to each of the different types of messages that it receives. The format and content of each of the messages is defined in the aforementioned Basic Rate Interface document. In FIGS. 4 through 6, sequences of steps to be performed by the computer 101 are shown in connection with each of the different messages which may be received. In each case, the message received will include a call reference value. The call appearance values are included only in the ASSOCIATED (SETUP) message and the SETUP message. For the other messages the call reference value is translated into a station number by means of the information in the State Table (Table 3) in memory 310. The call reference value is a value assigned to a call for its duration. It uniquely identifies the call and is incorporated in all messages relating to the identified call. As indicated above with reference to the ASSOCIATED (SETUP) message, the call reference value is stored in the State Table in memory 310 at the time that message is received. For subsequently received messages, the call reference value is translated to a station number based on the relationship between the station number and the call reference value defined in the State Table. This action is reflected in blocks 412, 413, 414, 416, 417, and 418. The receipt of each message by the computer causes the state of the call in the State Table (Table 3) to be updated to the state represented by the received message. Table 1 recites function statements which indicate the interpretation that the computer 101 attaches to each of the messages. The step of updating the state information in the State Table is shown for example in blocks 431, 432, 423, 424, 435, 426, 427 and 428. In response to receiving each of the messages, the computer also generates a time stamp and enters the time stamp together with state change information and the station number in the State Change Table of memory 310. An exemplary memory layout for the State Change Table is shown in Table 4. The action of updating the State Change Table is reflected in blocks 441, 442, 433, 434, 445, 436, 437 and 438.

The sequence followed by computer 101 is essentially the same for the CONNECT, ASSOCIATED (RE- CONNECT), and ASSOCIATED (HOLD) and the steps have been described, generally, above. The actions of the computer 101 in response to the ALERTING message, the ASSOCIATED (CONNECT) message, the SETUP message, and the DISCONNECT message involve additional steps beyond those explained above and will be described in further detail. Block 402 represents the receipt of the ALERTING message from the switch 110. As shown in Table 1, the computer interprets this message as indicating that the far end, i.e. the called party, is being alerted. Block 412 represents a translation of the call reference value to station number with the aid of information in the State Table in memory 310. Block 422 indicates a further translation from station number to call appearance number also obtained from the State Table. In block 432 the state of the call in the State Table is updated to "far end alerting". In block 442 the time stamp representing current time is entered into the State Change Table in memory 310 (Table 4) together with the station number and an indication of a state change from "dialing" to "alerting". For record keeping purposes it is desirable to record the called station directory number. The ASSOCIATED (SETUP) message, which proceeds alerting, may include in its display field the outgoing call directory number. However, this field is optional and the directory number may be omitted from the ASSOCIATED (SETUP) message. In any event, the called line identification will be displayed on the agent terminal, as a normal ISDN feature, and is obtainable by an INFORMATION message from the computer 101 to the switch 110. Block 461 represents the sending of such a message. Block 462 represents a follow-up message including the call appearance number which defines for the switch the identity of the desired display. Block 463 represents an information message from the switch 110 to the processor 101 providing the display information. Block 464 represents the action by the computer of reading the called number from the display information and block 465 represents entering this number in the Call Log in memory 310. An exemplary memory layout of the Call Log is shown in Table 5. The information entered in the Call Log includes a date and time stamp of current time, the station number derived in block 412, the called number obtained in block 464, the call reference value, and an indication that this is the start of an outgoing call.

As outlined in Table 1, for a normally progressing call, the ALERTING message is followed by the CONNECT message and a DISCONNECT message. The processing of the CONNECT message by the computer is indicated in block 404 and the actions taken in response to the receipt of that message are indicated in blocks 414, 424, 434 and 444, as explained earlier. The receipt of the DISCONNECT message is shown in block 408. In addition to the actions taken in blocks 418, 428 and 438, which have been discussed earlier herein, the computer, in block 439 obtains the calling number, if any, from the State Table and makes an entry in the Call Log (Table 5) in memory 310 in block 448. The Call Log entry will include a date and time stamp, the station number, the far party number, the call reference value and an indication that this is the end of the call.

In the event of a termination of a call to one of the agent stations, a SETUP message is transmitted from the switch to one of the agents' terminals 120 and the same message is received by the computer 101, as illustrated in Table 1. In FIG. 5, box 405 represents the receipt of the SETUP message by the computer. The SETUP message will include a call appearance number and a call reference number. In block 415 the call appearance number is translated to a station number by means of the State Table represented by Table 3. In block 425 the call reference value defined by the message is entered in the State Table in memory 310. In block 435 the state of the call is updated to "ringing" in the State Table. An entry is made in the State Change Table in memory 103 (Table 4) including a time stamp indicating current time, the station number and an indication that the state has changed from "idle" to "ringing" in block 445. The SETUP message incorporates a display field defining the calling number. In block 471 this calling number is obtained from the display field and in block 472 it is entered into the State Table in memory 310. Thereafter, an advance is made to block 474 to return to idle.

The computer 101 expects to receive an ASSOCIATED (CONNECT) message after receipt of the SETUP message, as indicated in Table 1. The receipt of this message is shown in block 403 of FIG. 5. In blocks 413, 423 and 433 the computer performs the functions of translating the call reference value to a station number based on information in the State Table, updates the State Table and updates the State Change Table. In block 443 the calling number is read from the State Table in memory 310 on the basis of the call reference value. In block 453 an entry is made in the Call Log in memory 310 including a time stamp, the agent station number, and "incoming" and "start" indication, the calling number and the call reference value. When a subsequent DISCONNECT message is received, another Call Log entry will be made showing the ending time. The agent stations typically will have a Hold feature and when this is activated the computer receives an ASSOCIATED (HOLD) message and a subsequent ASSOCIATED (RECONNECT) message. The receipt of these messages is represented by blocks 406 and 407 of FIG. 6 and the effect of these messages is to update the State Table (Table 3) and the State Change Table (Table 4) in memory 310 as described above.

Table 6 is a representation of station activity data which may be used to evaluate agent station activity. The data includes the number of incoming and outgoing calls and the total number of calls handled by each of the agent stations. In addition, the average holding (i.e. activated) time for incoming calls, outgoing calls, and all calls, as well as the percentage of time spent on incoming and outgoing calls and time spent in the idle state are recorded in this table, as described later herein with respect to FIGS. 7 and 8. Computer 101 generates these statistics on the basis of data in the State Change Table (Table 4) and Call Log (Table 5) in the memory 310. In a similar fashion the information of these tables may be used to compute average holding etc. for groups of agents. Not all of the information contained in the State Change table and the Call Log are used in this exemplary system. For example, information regarding the identity of the calling or called party in the Call Log may be used for other purposes. Similarly, state change information in the State Change Table may be used to compute the amount of time spent waiting for an answer from a called party, etc.

FIGS. 7 and 8 are flow chart representations of the software of the computer 101 used to derive the information of Table 6 from the State Change Table and the Call Log. Referring to FIG. 7, the Call Log is read in block 500 and in block 501 a "start time" entry for a selected station number is recorded. In block 503 the Call Log is searched for a corresponding call reference value having the "end time" entry. In block 505 the holding time is computed as the difference between the start time and the end time. In block 506 the computed holding time is added to the total holding time for the station. In block 507 the total call count for the station is incremented by 1. Block 511 is a decision block to determine whether the call for which the computations are made is an incoming call. If so, the transfers made to block 512 where the incoming call count is incremented and the holding time computed in block 505 is added to the total incoming holding time for the selected station, in block 513. In the event that it is an outgoing call, a transfer will be made from decision block 511 to block 514 where the outgoing call count is incremented. In block 515 the computed time will then be added to the total outgoing holding time for the station. For both incoming and outgoing calls, the next action is to determine whether there are more start times for the station under consideration, as represented by decision block 520. If so, a transfer is made to block 501 and the steps between blocks 501 and 520 are repeated for the next call for station N. After all calls for a station have been recorded and holding times properly computed, the decision in block 520 will reflect the fact that there are no more start times for station N and a transfer will be made to block 522 to compute data for station N. Average holding times for incoming calls, outgoing calls and all calls for station N are computed in blocks 522 to 524. This is based on the recorded incoming, outgoing and total counts and the corresponding holding times. In blocks 526 and 528 the percentage of time spent for incoming and outgoing calls is computed based on the ratios of the total incoming and outgoing holding times with respect to the total holding time. Thereafter, in block 530 a decision is made to determine if there are other stations for which the computations need to be made. If so, the value of N is incremented in block 531 to identify the next station and the process, beginning at block 501 is repeated. When the statistics for all stations have been compiled, the program terminates as indicated in block 532.

In addition to generating data defining holding time for outgoing calls, and the like, the computer is adapted to generate detailed billing records for outgoing calls made from the agent stations. Organizations employing agents making outgoing calls generally desire to have approximate telephone charges computed. In the present system, approximate charges are computed for each outgoing call. In blocks 514 and 515 of FIG. 7 actions are taken with respect to outgoing calls as described above. Subsequent to these actions, in block 550, the called number is read from the Call Log (Table 5) in its Far Party column. Thereafter, in block 551 the computer reads a rate table stored in memory 310. The rate table is a data table customarily provided by a telephone company or long distance carrier which defines the charges for telephone calls to other areas by area code and the office code, both of which are part of the telephone number recorded in the Call Log. In the exemplary Call Log of Table 5, the area code is omitted from some of the numbers indicating that those numbers have the same area code as the central office switch to which the computer is connected. The charges customarily depend on the time of day when the call was made as well as the length of time of the call. The length of time of the call was computed in block 505 of FIG. 7. The time of day, the fact that it is an outgoing call and the number of the called party are recorded in the Call Log. On the basis of this data the computer 101 computes billing data in a well-known fashion and stores such data in the memory 310 prior to advancing to decision block 520 for further action. This computing and storing billing data is indicated in block 552. In this illustrative system, outgoing call data in Table 6 is intended to cover all outgoing calls, including unanswered calls. Starting times for outgoing calls are recorded in the Call Log in response to the ALERTING message as shown in FIG. 4. However, that is before the call is answered. Hence, the billing computation shown in FIG. 7 includes ringing time and unanswered calls. If a more accurate billing computation is desired, the State Change Table may be consulted to identify unanswered calls (i.e. calls that did not make a change to the Talk State), and actual connect time, (i.e. from transition to the Talk State to disconnect).

FIG. 8 is a flow chart representation of a program for computing the time spent by each station and the idle state and recorded in FIG. 6. A time limit may be imposed on the program to recognize only idle time periods occurring during working hours in order to exclude off periods such as lunch time, etc. As shown in FIG. 8, block 600, this program reads the State Change Table of the memory 310, (Table 4). In block 601 the computer records the entry time of the transition to the idle state for a station N and in 602 obtains the first subsequent transition in time from idle to another state. In block 603 the idle time is computed as the difference between those state changes and in block 604 the total idle time for the station is computed. Block 610 is a decision block to determine if there are more transitions to idle for this station if so, a transfer is made back to block 601 to repeat the steps of block 601 through 604. When all the transitions for a particular station have been recorded, a transfer is made to decision block 612 to determine if there are other stations to be considered. If so, the station number is incremented in block 611 and a return is made to block 612, for the next station. The number N is an arbitrary designation for a station number and the step of incrementing N in block 611 represents an action by the computer to find the next station for which idle time is to be computed. When statistics have been compiled for all the stations, the program finishes as indicated in block 613. The data computed by means of the programs outlined in FIGS. 7 and 8 may be stored in memory 310 as station activity data in the form of Table 6. This information may be displayed to a manager by means of the display 108 which is connected to the computer 101 via interconnecting cabling 320.

It is to be understood that the above-described arrangement is merely an illustrative application of the principals of the invention. Numerous other arrangements may be devised by those skilled in the art without departing from the spirit and scope of the invention.

TABLE 1

| MESSAGE FLOW ON THE AGENT STATION | DIRECTION | MESSAGES RECEIVED BY THE COMPUTER | FUNCTION STATEMENT |
|---|---|---|---|
| CALL ORIGINATIONS: | | | |
| SETUP | STATION→SWITCH | | |

TABLE 1-continued

| MESSAGE FLOW ON THE AGENT STATION | DIRECTION | MESSAGES RECEIVED BY THE COMPUTER | FUNCTION STATEMENT |
|---|---|---|---|
| SETUP_ACK | SWITCH→STATION | ASSOCIATED (SETUP) | DIALING |
| CALL_PROCEEDING | SWITCH→STATION | | |
| ALERTING | SWITCH→STATION | ALERTING | FAR END ALERTING |
| CONNECT | SWITCH→STATION | CONNECT | TALKING |
| CONNECT_ACK | STATION→SWITCH | | |
| DISCONNECT | SWITCH→STATION or STATION→SWITCH | DISCONNECT | RETURN TO IDLE |
| CALL TERMINATIONS: | | | |
| SETUP | SWITCH→STATION | SETUP | RINGING |
| ALERTING | STATION→SWITCH | | |
| CONNECT | STATION→SWITCH | ASSOCIATED (CONNECT) | TALKING |
| DISCONNECT | SWITCH→STATION or STATION→SWITCH | DISCONNECT | RETURN TO IDLE |
| FEATURE ACTIVITIES: | | | |
| HOLD | STATION→SWITCH | | |
| HOLD_ACK | SWITCH→STATION | ASSOCIATED (HOLD) | HOLD |
| RECONNECT | STATION→SWITCH | | |
| RECONNECT_ACK | SWITCH→STATION | ASSOCIATED (RECONNECT) | TALKING |

TABLE 2

Message Information Elements
Protocol Discriminator
Call Reference
Message Type
Bearer Capability
Channel Identification
Progress Indicator
Terminal Capabilities
Keypad
Signal
Switchhook
Locking Shift
Selected Call Appearance
Origination Call Appearance
Destination Call Appearance
Display Field
Feature Activation
Feature Indication
Adjunct Control

TABLE 3

STATE TABLE

| Station Number | Call Appearance (CA)# | State | Call Reference (CR) Value | Calling Number |
|---|---|---|---|---|
| 555-6012 | 4 | Idle | — | |
| 555-6013 | 5 | Dialing | 28 | |
| 555-6014 | 6 | Dialing Complete | 21 | |
| 555-6015 | 7 | Ringing | 4 | 312-555-7000 |
| 555-6016 | 8 | Talking | 72 | |
| 555-6017 | 9 | Far End Alerting | 61 | |
| 555-6018 | 10 | Hold | 15 | |

TABLE 4

STATE CHANGE TABLE

| Date | Time | Station # | State Change |
|---|---|---|---|
| 12/05/88 | 1:52:45 | 555-6012 | Idle to Dialing |
| 12/05/88 | 1:53:00 | 555-6012 | Dialing to Far-End-Alert |
| 12/05/88 | 1:53:40 | 555-6012 | Far-End-Alert to Talk |
| 12/05/88 | 2:05:17 | 555-0612 | Talk to Idle |
| 12/05/88 | 2:15:01 | 555-6017 | Idle to Ring |
| 12/05/88 | 2:16:02 | 555-6017 | Ring to Idle |

TABLE 5

CALL LOG

| Date | Time | Station # | Direction | Start/End | Far Party | Call Ref. |
|---|---|---|---|---|---|---|
| 12/05/88 | 1:12:05 | 555-6015 | Incoming | Start | 312-555-7000 | 4 |
| 12/05/88 | 1:53:00 | 555-6012 | Outgoing | Start | 712-5053 | 3 |
| 12/05/88 | 2:05:07 | 555-6015 | | End | 312-555-7000 | 4 |
| 12/05/88 | 2:05:17 | 555-6012 | | End | | 3 |
| 12/05/88 | 2:16:02 | 555-6017 | | End | 312-555-7000 | 9 |

TABLE 6

STATION ACTIVITY DATA

| Measurement | Station 6012 | Station 6013 | Station N |
|---|---|---|---|
| No. of IN calls | X | X | X |
| No. of OUT calls | X | X | X |
| Total No. of calls | X | X | X |
| Average Holding Time IN calls | X | X | X |
| Average Holding Time OUT calls | X | X | X |
| Average Holding Time ALL calls | X | X | X |
| % of time spent in IN calls | X | X | X |
| % of time spent in OUT calls | X | X | X |
| time spent in idle state | X | X | X |

We claim:

1. A management information generating system for use with an ISDN switching system and a plurality of telephone agent stations connected to said switching system, and comprising:

computer means comprising means connected to said switching system via an ISDN subscriber line for receiving digital messages from said switching system corresponding to digital call handling messages transmitted between said system and said stations via subscriber lines other than said ISDN subscriber line connected to said computer means; and said computer means further comprising means responsive to said digital messages for generating information defining past activities of said stations.

2. Apparatus for collecting information on activity of a telephone station connected to a central office switching system via a first subscriber line, comprising:

computer means comprising means for connection to said switching system via a second subscriber line having a shared call appearance with said station on said switch for receiving shared call appearance associated messages from said switching system; and said computer means further comprising means responsive to said shared call appearance messages transmitted on said second subscriber line corresponding to call handling information transmitted between said switching system and said station for generating data representative of call handling activity of said station.

3. Apparatus for collecting information on activities of a plurality of telephone stations connected to an ISDN switching system via ISDN subscriber lines connected thereto, said switching system exchanging call handling information with said stations and generating associated ISDN messages corresponding to said call handling information, said apparatus comprising:
   computing means responsive to said associated ISDN messages for generating data representative of call handling activities of said stations; and
   means for connecting said computing means to an ISDN subscriber line other than said ISDN subscriber lines connecting said stations to said switching system, said connecting means for receiving said associated ISDN messages.

4. A method of generating management information relating to a plurality of agent stations handling telephone calls via an ISDN switching system, comprising the steps of:
   connecting computing means to said switching system via an ISDN subscriber line;
   assigning to said computing means shared call appearances with said plurality of stations;
   transmitting from said switching system to said computing means associated ISDN messages corresponding to call handling information exchanged between said switching system and each of said stations via subscriber lines other than said ISDN subscriber line connecting said computing means to said switching system;
   interpreting said associated messages at said computing means and recording in said computing means call data defining call initiation times and call termination times for calls involving said stations; and
   generating at said computing means measurement data defining a measurement of call handling activity for each of said stations.

5. In combination, an ISDN switching system having ISDN subscriber lines and a plurality of telephone agent stations connected to said system via a plurality of said ISDN subscriber lines for exchanging ISDN messages with said system, and computer means connected to said switching system via one of said ISDN subscriber lines other than said plurality of ISDN subscriber lines connected to said agent stations;
   said switching system transmitting on said one of said subscriber lines associated messages representative of ISDN messages transferred between said switching system and said stations via said plurality of subscriber lines; and
   said computer means comprising means for recording data representative of call status of each call relating to each of said stations and means for recording data representative of call handling activities for all calls for each of said stations over a period of time.

6. A method of collecting data representative of call handling activities of a plurality of telephone agent stations connected to an ISDN switching system via ISDN subscriber lines, comprising the steps of:
   exchanging ISDN control messages between said switching system and said stations over said ISDN lines;
   transmitting to a computer connected to said switching system via an ISDN subscriber line other than said ISDN subscriber lines connected to said agent stations, associated messages corresponding to call handling messages exchanged between said switching system and said stations;
   interpreting said associted messages at said computer; and
   generating at said computer data defining call handling activities of said stations over a period of time.

7. Apparatus for generating management information for a plurality of telephone stations connected via subscriber lines to an ISDN switching system generating associated ISDN messages representative of call handling messages exchanged between said stations and said switching system via said subscriber lines, comprising:
   computing means;
   display means connected to said computing means; and
   interface means for connecting, via a subscriber line other than said subscriber lines connected to said stations, said computing means to said ISDN switching system connected to said stations; and
   said computing means responsive to said associated ISDN messages for controlling said display means to display data representative of call handling activities of said stations.

8. Apparatus in accordance with claim 7 wherein at least one of said subscriber lines connected to said stations is an analog line.

9. Apparatus in accordance with claim 8 wherein at least one of said subscriber lines connected to said stations is a digital line.

10. An arrangement for generating data representative of call handling activities of a plurality of telephone agent stations located remotely from each other and each connected to a different one of a plurality of ISDN switching systems via a subscriber line, comprising:
   a plurality of monitoring means, each means individually connected to one of said switching systems via a subscriber line other than a subscriber line connected to an agent station and each responsive to ISDN messages communicated between certain of said stations and said individually connected one of said switching systems for generating data representative of call handling activities of each of said stations connected to said individually connected one of said switching systems;
   computing means responsive to data transmitted by each of said monitoring means for generating data representative of call handling activities for all of said plurality of stations; and
   means for transmitting data from each of said monitoring means to said computing means.

11. The arrangement in accordance with claim 10 wherein each of said switching systems generates associated ISDN messages representative of messages transmitted between said switching systems and said stations and wherein each of said monitoring means interprets said associated messages and sends data defining station activity to said computing means.

12. An arrangement for collecting data representative of call activities of a plurality of telephone agents, each of said agents having an agent station, certain of said stations connected via subscriber lines to a first ISDN switching system and others of said stations connected via subscriber lines to a second ISDN switching system, each of said switching systems generating associated messages representative of call handling information exchanged between each of said systems and said connected stations, said arrangement comprising:

an ISDN message monitoring device comprising means for connecting to said first and said second switching system via subscriber lines other than subscriber lines connected to agent stations, and for receiving said associated messages from said first and said second switching systems; and means responsive to associated ISDN messages received from said first and said second switching system representative of ISDN messages exchanged between each of said switching systems and said agent stations for generating data representative of call handling activities of all of said agents connected to said first and said second switching systems.

13. A method of collecting data representative of call handling activities of a plurality of telephone agent stations connected via subscriber lines to an ISDN switching system comprising the steps of:

monitoring associated ISDN messages representative of call handling messages exchanged between said switching system and said stations, said associated messages being transmitted via subscriber lines other than said subscriber lines connected to said agent stations;

converting said associated ISDN messages into data representative of functions performed by said stations;

transmitting said data to a computer means; and generating at said computer means data defining call handling activities of all of said stations.

14. A billing information generating system for use with an ISDN switching system having a plurality of telephone agent stations connected thereto via ISDN subscriber lines, and an additional ISDN subscriber line not connected to said stations, and generating on said additional ISDN subscriber line digital messages corresponding to call handling information transmitted between said system and said stations, said billing information generating system comprising:

means for connection to said additional subscriber line and for receiving said digital messages;

means for recording call initiation and call termination information for each of said stations derived from said digital messages; and means for computing billing charges for calls for each of said stations.

* * * * *